（12) United States Patent
Tseug et al.

(10) Patent No.: US 9,525,367 B2
(45) Date of Patent: Dec. 20, 2016

(54) FAN MOTOR BRAKING APPARATUS AND METHOD OF CONTROLLING THE SAME

(71) Applicant: DELTA ELECTRONICS, INC., Taoyuan County (TW)

(72) Inventors: Wei-Shuo Tseug, Taoyuan County (TW); Chia-Feng Wu, Taoyuan County (TW); Ming-Lung Liu, Taoyuan County (TW); Yu-Jen Liang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 3 days.

(21) Appl. No.: 14/314,467

(22) Filed: Jun. 25, 2014

(65) Prior Publication Data

US 2015/0188459 A1 Jul. 2, 2015

(30) Foreign Application Priority Data

Dec. 26, 2013 (TW) .............................. 102148363 A

(51) Int. Cl.
*H02K 7/10* (2006.01)
*H02P 3/12* (2006.01)
(Continued)

(52) U.S. Cl.
CPC . *H02P 3/22* (2013.01); *H02P 6/20* (2013.01); *H02P 6/08* (2013.01); *H02P 6/15* (2016.02); *H02P 6/22* (2013.01)

(58) Field of Classification Search
CPC ............. H02P 3/22; H02P 3/08; H02P 7/0066; H02P 6/08; H02P 6/15; H02P 6/20; H02P 6/22; H02K 11/0073; H02K 17/30; F25B 2600/11; H03K 17/08122; H02H 7/0833
(Continued)

(56) References Cited

U.S. PATENT DOCUMENTS 7,446,492 B2 11/2008 Wei et al.
8,587,909 B2 11/2013 Wu et al.
(Continued)

FOREIGN PATENT DOCUMENTS

EP 0324614 7/1995
TW 200723666 6/2007
(Continued)

OTHER PUBLICATIONS

Office Action dated Feb. 10, 2015 from corresponding No. TW 102148363.

*Primary Examiner* — Bentsu Ro
*Assistant Examiner* — Zemenay Truneh
(74) *Attorney, Agent, or Firm* — Hauptman Ham, LLP

(57) ABSTRACT

A fan motor braking apparatus and a method of controlling the same provide a braking protection before the fan motor revolves. The fan motor braking apparatus includes a conversion circuit, a braking enable circuit, a braking release circuit, and a fan motor startup circuit. The conversion circuit has a plurality of power switch elements electrically connected to the fan motor. The braking enable circuit is connected to the conversion circuit and the braking release circuit is connected to the braking enable circuit. The fan motor startup circuit receives an external DC voltage. The braking enable circuit generates a braking control signal to turn on the power switch elements when the braking enable circuit receives the external DC voltage, thus braking the fan motor.

20 Claims, 5 Drawing Sheets

(51) Int. Cl.
  *H02P 3/22*   (2006.01)
  *H02P 6/20*   (2016.01)
  H02P 6/22   (2006.01)
  H02P 6/08   (2016.01)

(58) Field of Classification Search
  USPC ............... 318/362, 273, 703, 375–380, 365
  See application file for complete search history.

(56) References Cited

U.S. PATENT DOCUMENTS

| | | |
|---|---|---|
| 8,847,525 B2 | 9/2014 | Taniguchi et al. |
| 2010/0066279 A1* | 3/2010 | Frankel ................ H02P 3/22 318/379 |
| 2012/0153880 A1* | 6/2012 | Cerrato ................ H02P 7/285 318/369 |
| 2013/0181645 A1* | 7/2013 | Kopken ................ H02P 3/22 318/400.22 |
| 2013/0271046 A1 | 10/2013 | Sussman |
| 2013/0289809 A1* | 10/2013 | Treharne ................ B60L 1/003 701/22 |

FOREIGN PATENT DOCUMENTS

| | | |
|---|---|---|
| TW | 201218626 | 5/2012 |
| TW | 201338397 | 9/2013 |

\* cited by examiner

FAN MOTOR BRAKING APPARATUS AND METHOD OF CONTROLLING THE SAME

BACKGROUND

1. Technical Field

The present disclosure relates generally to a fan motor braking apparatus and a method of controlling the same, and more particularly to a fan motor braking apparatus and a method of controlling the same providing a braking protection before the fan motor revolving.

2. Description of Related Art

Reference is made to FIG. 1 which is a schematic circuit diagram of a prior art fan motor control structure. The fan motor drive circuit structure includes a conversion circuit 10A, a driving controller 20A, and a fan motor 50A. The conversion circuit 10A has a plurality of power switch elements Q1-Q6 electrically connected to the fan motor 50A. In this embodiment, a three-phase DC motor is exemplified as the fan motor 50A, also the conversion circuit 10A has three legs connected in parallel to each other and each leg has two power switch elements connected in series. The conversion circuit 10A receives an external DC voltage Vdc and converts the external DC voltage Vdc into the required power for supplying the fan motor 50A. In addition, the driving controller 20A generates six switch driving signals Sd1-Sd6 to correspondingly switch the power switch elements Q1-Q6, thus driving the fan motor 50A revolving.

In general, the fan motors are applied to be heat-dissipating fans for cooling server hosts installed in a server room. Because the installations and operation conditions of the server hosts are different, stationary fan motors are easily influenced by return air produced in the server room and even the fan motors reversely revolves so that the fan motors are damaged or failed startup.

Accordingly, it is desirable to provide a fan motor braking apparatus and a method of controlling the same provide a braking protection to ensure that the fan motor is stationary before the fan motor revolves, thus avoiding damage or failed startup of the fan motor from external force. In addition, simple electronic components, such as transistor(s), resistor(s), and capacitor(s) are used to implement high-accurate control of brake protection, brake release, and startup rotation for the fan motor.

SUMMARY

An object of the present disclosure is to provide a fan motor braking apparatus providing a braking protection before the fan motor revolving to solve the above-mentioned problems. Accordingly, the fan motor braking apparatus includes a conversion circuit, a braking enable circuit, a braking release circuit, and a fan motor startup circuit. The conversion circuit has a plurality of power switch elements, and is electrically connected to the fan motor. The power switch elements are configured to form a multiple-leg circuit with upper legs and lower legs. The braking enable circuit is connected to the conversion circuit, and is configured to receive an external DC voltage. The braking release circuit is connected to the braking enable circuit, and is configured to receive the external DC voltage to charge a first resistor-capacitor circuit of the braking release circuit. The fan motor startup circuit is configured to receive the external DC voltage. Wherein the braking enable circuit is configured to generate a braking control signal to turn on the power switch elements of the lower legs to brake the fan motor when the braking enable circuit is configured to receive the external DC voltage; the braking enable circuit is configured to stop outputting the braking control signal to turn off the power switch elements of the lower legs to release the brake on the fan motor when the first resistor-capacitor circuit is charged to enable the braking release circuit.

Another object of the present disclosure is to provide a fan motor braking apparatus providing a braking protection before the fan motor revolving to solve the above-mentioned problems. Accordingly, the fan motor braking apparatus includes a conversion circuit, a braking enable circuit, a braking release circuit, and a fan motor startup circuit. The conversion circuit has a plurality of power switch elements, a plurality of auxiliary power switch elements, and a plurality of current-limiting resistors, and is electrically connected to the fan motor. The power switch elements are configured to form a multiple-leg circuit with upper legs and lower legs. The braking enable circuit is connected to the conversion circuit, and is configured to receive an external DC voltage. The braking release circuit is connected to the braking enable circuit, and is configured to receive the external DC voltage to charge a first resistor-capacitor circuit of the braking release circuit. The fan motor startup circuit is configured to receive the external DC voltage. Wherein the braking enable circuit is configured to generate a braking control signal to turn on the auxiliary power switch elements to brake the fan motor when the braking enable circuit is configured to receive the external DC voltage; the braking enable circuit is configured to stop outputting the braking control signal to turn off the auxiliary power switch elements to release the brake on the fan motor when the first resistor-capacitor circuit is charged to enable the braking release circuit.

Further another object of the present disclosure is to provide a method of controlling a fan motor braking apparatus providing a braking protection before the fan motor revolving to solve the above-mentioned problems. Accordingly, the method comprises following steps: (a) a conversion circuit with a plurality of power switch elements is provided, wherein the conversion circuit is electrically connected to the fan motor; and (b) a braking enable circuit is enabled by an external DC voltage and a braking control signal is generated to turn on the power switch elements, thus braking the fan motor.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
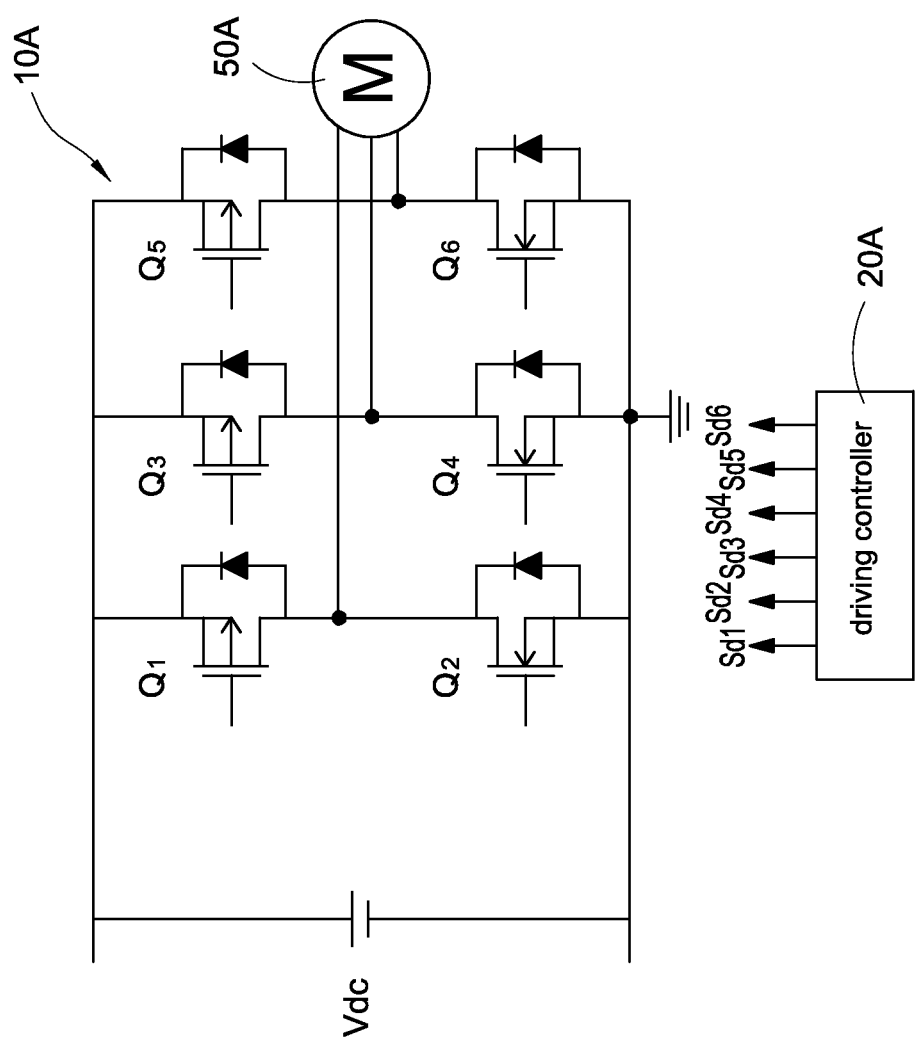
FIG. 1 is a schematic circuit diagram of a prior art fan motor control structure.

Reference will now be made to the drawing figures to describe the present invention in detail.

Figure 2A:
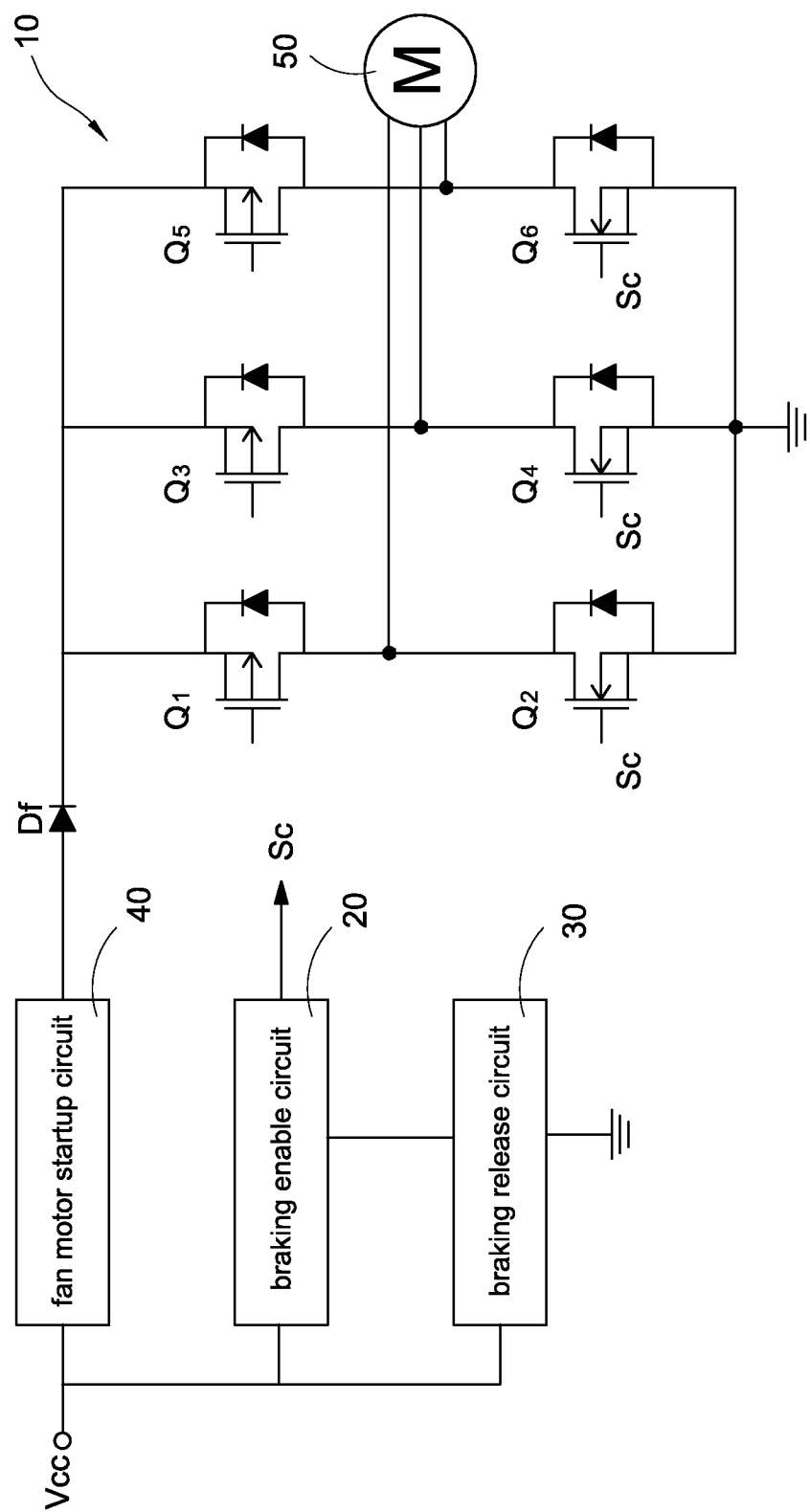
FIG. 2A is a schematic circuit block diagram of a fan motor braking apparatus according to a preferred embodiment of the present disclosure.

Reference is made to FIG. 2A which is a schematic circuit block diagram of a fan motor braking apparatus according to a preferred embodiment of the present disclosure. The fan motor braking apparatus provides a braking protection before a fan motor 50 revolves. The fan motor braking apparatus includes a conversion circuit 10, a braking enable circuit 20, a braking release circuit 30, and a fan motor startup circuit 40. The conversion circuit 10 has a plurality of power switch elements, and the conversion circuit 10 is electrically connected to the fan motor 50. As shown in FIG. 2A, the fan motor 50 is a three-phase DC motor. Hence, the conversion circuit 10 has three legs connected in parallel to each other and each leg has two power switch elements connected in series. That is, a first power switch element Q1 is connected to a second power switch element Q2 in series to form a first leg (not labeled); a third power switch element Q3 is connected to a fourth power switch element Q4 in series to form a second leg (not labeled); and a fifth power switch element Q5 is connected to a sixth power switch element Q6 in series to form a third leg (not labeled). In addition, a common connection of the two power switch elements of each leg is electrically connected to one phase of the fan motor 50 to form a control scheme for a three-phase DC motor structure. However, the embodiment is only exemplified but is not intended to limit the scope of the disclosure. That is, the fan motor 50 can be a single-phase DC motor, and the conversion circuit 10 is correspondingly a single-phase DC motor control structure.

The braking enable circuit 20 is connected to the conversion circuit 10, and the braking enable circuit 20 receives an external DC voltage Vcc. More specifically, the braking enable circuit 20 is connected to the second power switch element Q2, the fourth power switch element Q4, and the sixth power switch element Q6 of the conversion circuit 10. The braking release circuit 30 is connected to the braking enable circuit 20, and the braking release circuit 30 receives the external DC voltage Vcc. The fan motor startup circuit 40 receives the external DC voltage Vcc.

The braking enable circuit 20 generates a braking control signal Sc to turn on the power switch elements when the braking enable circuit 20 is enabled by the external DC voltage Vcc, thus braking the fan motor 50 to ensure that the fan motor 50 is stationary before the fan motor 50 is started up. More specifically, the braking enable circuit 20 generates the braking control signal Sc to simultaneously apply to gates of the second power switch element Q2, the fourth power switch element Q4, and the sixth power switch element Q6 to simultaneously turn on the second power switch element Q2, the fourth power switch element Q4, and the sixth power switch element Q6, thus simultaneously grounding the three legs to brake the fan motor 50.

When the fan motor 50 is braked to stationary, the braking enable circuit 20 is disabled by the braking release circuit 30 to stop outputting the braking control signal Sc from the braking enable circuit 20, thus turning off the power switch elements and releasing the brake on the fan motor 50. More specifically, when the fan motor 50 is braked to stationary, the braking enable circuit 20 is disabled by the braking release circuit 30 to simultaneously stop outputting the braking control signal Sc to gates of the second power switch element Q2, the fourth power switch element Q4, and the sixth power switch element Q6 so that the three legs are not simultaneously grounded to release the brake on the fan motor 50. When the brake on the fan motor 50 is released, the fan motor startup circuit 40 receives the external DC voltage Vcc to start up the fan motor 50. More specifically, when the brake on the fan motor 50 is released, the fan motor startup circuit 40 receives the external DC voltage Vcc and the external DC voltage is provided to the conversion circuit 10 through the fan motor startup circuit 40 to convert and provide the required power for supplying the fan motor 50. In addition, a drive controller (not shown) is provided to switch the power switch elements to drive the fan motor 50 revolving by the required power. In addition, the fan motor braking apparatus further includes a diode Df. The diode Df is electrically connected between the conversion circuit 10 and the fan motor startup circuit 40 to ensure that the external DC voltage Vcc is provided to the conversion circuit 10 through the fan motor startup circuit 40 and the external DC voltage Vcc is converted into the required power for supplying the fan motor 50.

Figure 2B:
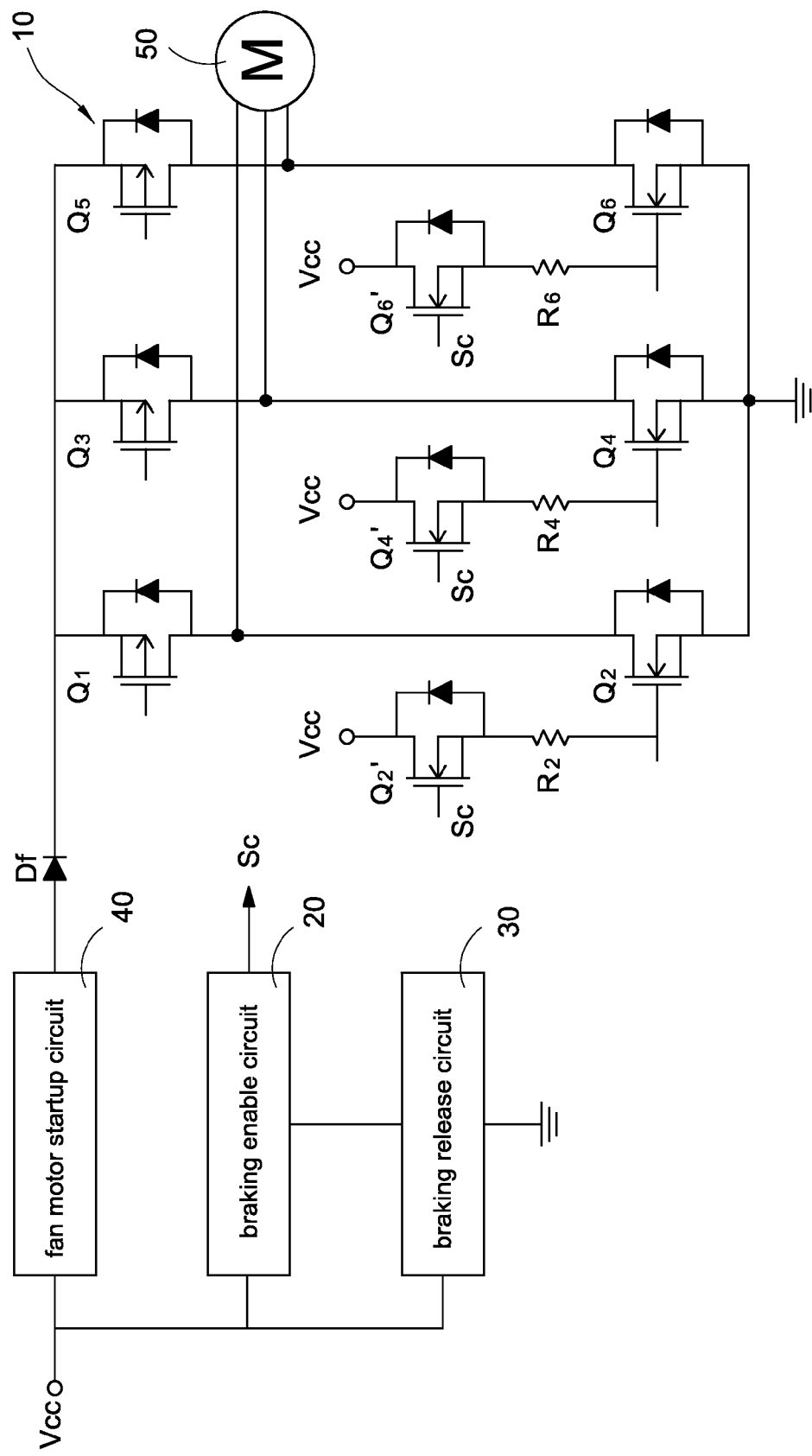
FIG. 2B is a schematic circuit block diagram of the fan motor braking apparatus according to another preferred embodiment of the present disclosure.

Reference is made to FIG. 2B which is a schematic circuit block diagram of the fan motor braking apparatus according to another preferred embodiment of the present disclosure. The major difference between the embodiment in FIG. 2B and the embodiment in FIG. 2A is that each leg of the conversion circuit 10 further has an auxiliary power switch element and a current-limiting resistor. More specifically, the gate of the second power switch element Q2 is connected to a source of a first auxiliary power switch element Q2' through a first current-limiting resistor R2, and a drain of the first auxiliary power switch element Q2' is supplied by the external DC voltage Vcc. Similarly, the gate of the fourth power switch element Q4 is connected to a source of a second auxiliary power switch element Q4' through a second current-limiting resistor R4, and a drain of the second auxiliary power switch element Q4' is supplied by the external DC voltage Vcc. Similarly, the gate of the sixth power switch element Q6 is connected to a source of a third auxiliary power switch element Q6' through a third current-limiting resistor R6, and a drain of the third auxiliary power switch element Q6' is supplied by the external DC voltage Vcc. Especially, the gates of the first auxiliary power switch element Q2', the second auxiliary power switch element Q4', and the third auxiliary power switch element Q6' are simultaneously controlled by the braking control signal Sc generated from the braking enable circuit 20. The detailed operation of the fan motor braking apparatus and the method of controlling the same will be described hereinafter as follows.

Figure 3:
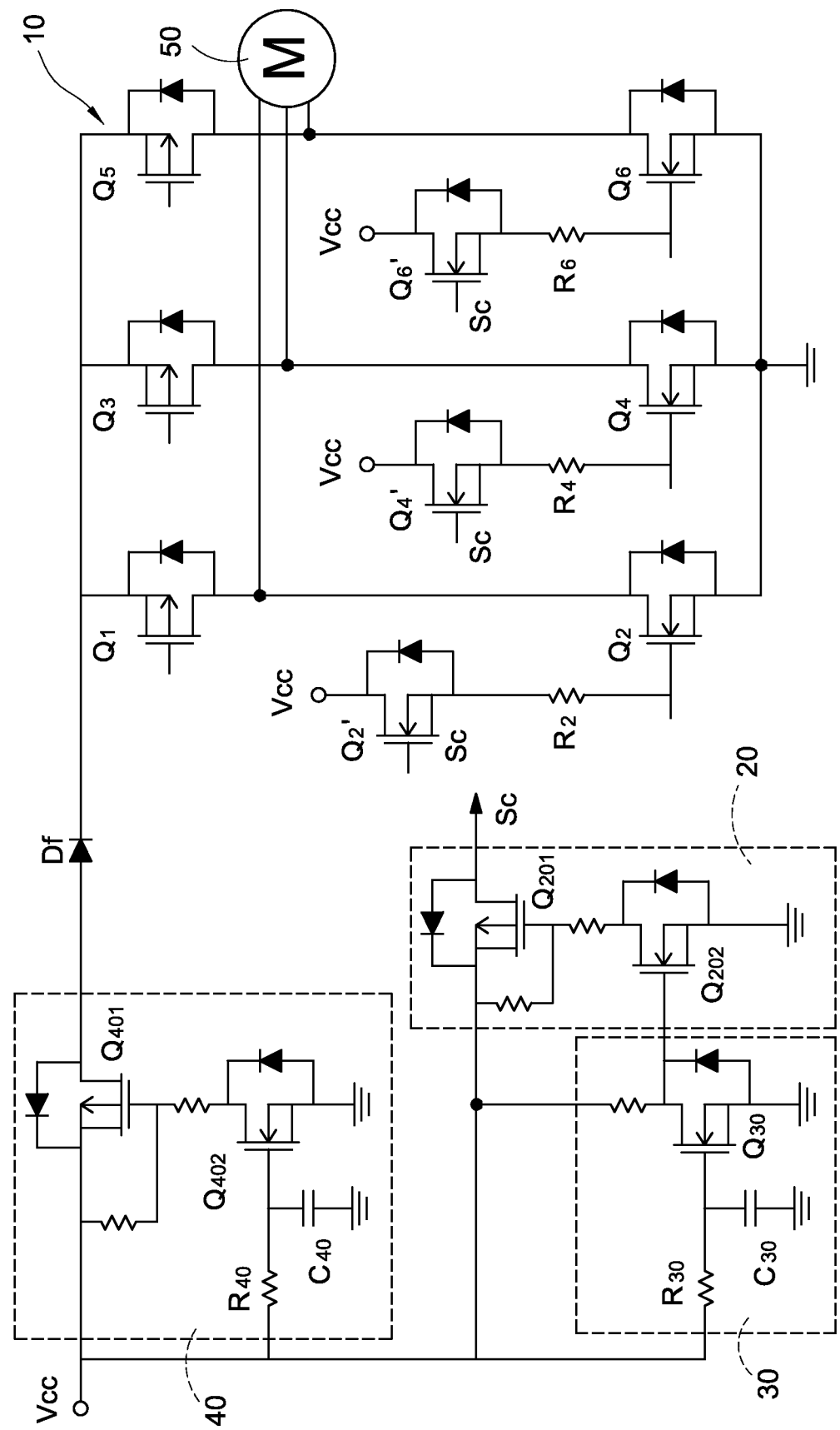
FIG. 3 is a circuit diagram of the fan motor braking apparatus according to the present disclosure.

Reference is made to FIG. 3 which is a circuit diagram of the fan motor braking apparatus according to the present disclosure. In this embodiment, the corresponding operations of the braking enable circuit 20, the braking release circuit 30, and the fan motor startup circuit 40 are further described in detail. Especially, the braking enable circuit 20, the braking release circuit 30, and the fan motor startup circuit 40 can be implemented by hardware designs of electronic circuits. However, the embodiment is only exemplified but is not intended to limit the scope of the disclosure. That is, the functions of braking and starting up the fan motor 50 can be implemented by software or firmware designs. The hardware designs of electronic circuits are exemplified for further demonstration and described as follow.

The braking enable circuit 20, the braking release circuit 30, and the fan motor startup circuit 40 are composed of electronic components, such as transistor(s), resistor(s), and capacitor(s). The braking enable circuit 20 mainly has a first braking enable power switch Q201, a second braking enable power switch Q202, and at least one resistor (not labeled) electrically connected between the first braking enable power switch Q201 and the second braking enable power switch Q202. The braking release circuit 30 mainly has a braking release power switch Q30, a braking release resistor R30, and a braking release capacitor C30. The fan motor startup circuit 40 mainly has a first startup power switch Q401, a second startup power switch Q402, a startup resistor R40, a startup capacitor C40, and at least one resistor (not labeled) electrically connected between the first startup power switch Q401 and the second startup power switch Q402.

When the fan motor braking apparatus receives the external DC voltage Vcc, the braking enable circuit 20, the braking release circuit 30, and the fan motor startup circuit 40 are connected to the external DC voltage Vcc so that the external DC voltage Vcc simultaneously supplies power to the braking enable circuit 20, the braking release circuit 30, and the fan motor startup circuit 40. Because the braking enable circuit 20 is supplied by the external DC voltage Vcc, the first braking enable power switch Q201 and the second braking enable power switch Q202 are turned on by the external DC voltage Vcc, and the braking control signal Sc is generated from the braking enable circuit 20. Especially, the braking control signal Sc is a high-level control signal and the braking control signal Sc is simultaneously applied to gates of the first auxiliary power switch element Q2', the second auxiliary power switch element Q4', and the third auxiliary power switch element Q6' to simultaneously turn on the second power switch element Q2, the fourth power switch element Q4, and the sixth power switch element Q6, thus simultaneously grounding the three legs to brake the fan motor 50.

In addition, the braking release circuit 30 and the fan motor startup circuit 40 are simultaneously supplied by the external DC voltage Vcc when the braking enable circuit 20 is supplied by the external DC voltage Vcc. At this time, a first resistor-capacitor (RC) circuit composed of the braking release resistor R30 and the braking release capacitor C30 is charged by the external DC voltage Vcc. Also, a second resistor-capacitor (RC) circuit composed of the startup resistor R40 and the startup capacitor C40 is charged by the external DC voltage Vcc. The first RC circuit provides a first time constant τ1 and the second RC circuit provides a second time constant τ2. Especially, the second time constant τ2 is greater than the first time constant τ1. In other words, τ2=R40×C40>τ1=R30×C30. Accordingly, the speed of charging the braking release capacitor C30 is faster than that of charging the startup capacitor C40 when the first RC circuit and the second RC circuit are simultaneously charged by the external DC voltage Vcc. Hence, the braking release power switch Q30 is first turned on so that the first braking enable power switch Q201 and the second braking enable power switch Q202 are turned off when the voltage of charging the braking release capacitor C30 is high enough to up to a voltage level. Accordingly, the braking enable circuit 20 stops simultaneously outputting the braking control signal Sc to gates of the first auxiliary power switch element Q2', the second auxiliary power switch element Q4', and the third auxiliary power switch element Q6' so that the legs are not simultaneously grounded to release the brake on the fan motor 50.

Afterward, the first startup power switch Q401 and the second startup power switch Q402 are turned on when the voltage of charging the startup capacitor C40 is high enough to up to a voltage level. Hence, the external DC voltage Vcc is provided to the conversion circuit 10 through the fan motor startup circuit 40 to convert and provide the required power for supplying the fan motor 50. In addition, a drive controller (not shown) is provided to switch the power switch elements to drive the fan motor 50 revolving by the required power.

In addition, the conversion circuit 10 can be introduced without using the auxiliary power switch elements and the current-limiting resistors. In other words, the braking control signal Sc can be directly applied to gates of the second power switch element Q2, the fourth power switch element Q4, and the sixth power switch element Q6 to brake the fan motor 50 before the fan motor 50 revolves as shown in FIG. 2. Therefore, the detail descriptions are omitted here for conciseness.

Figure 4:
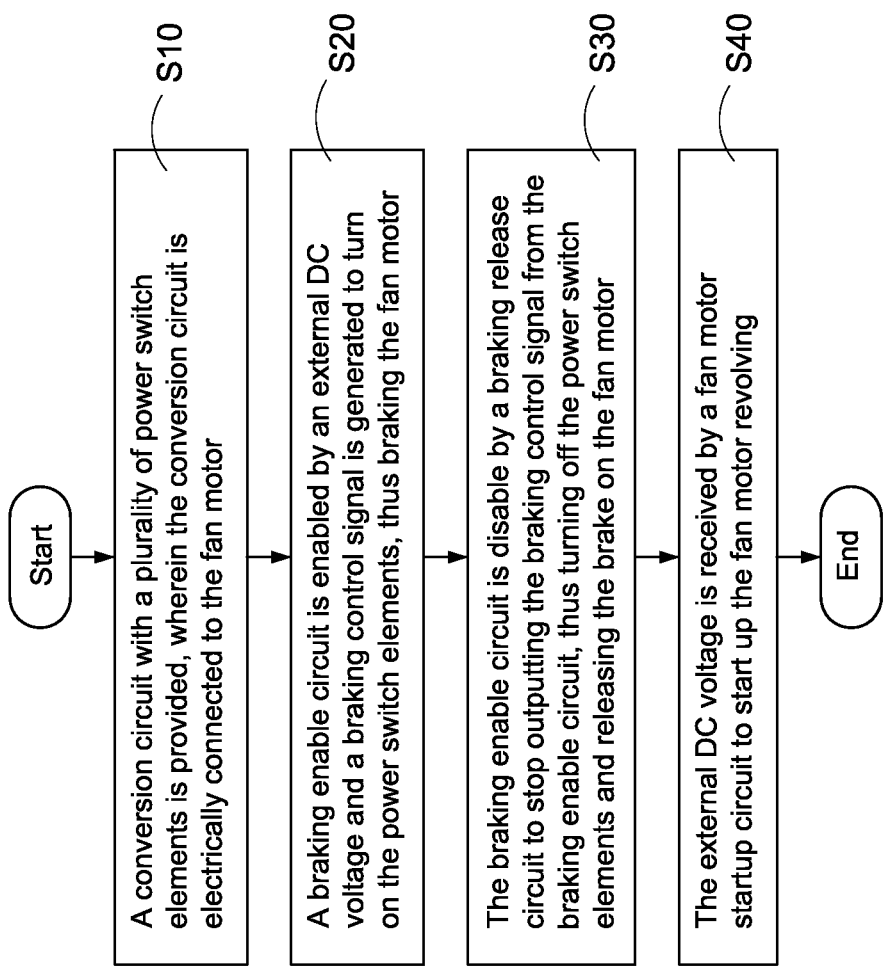
FIG. 4 is a flowchart of a method of controlling a fan motor braking apparatus according to the present disclosure.

Reference is made to FIG. 4 which is a flowchart of a method of controlling a fan motor braking apparatus according to the present disclosure. The method of controlling a fan motor braking apparatus provides a braking protection before the fan motor revolving, which includes following steps: First, a conversion circuit with a plurality of power switch elements is provided, wherein the conversion circuit is electrically connected to the fan motor (S10). In particular, the fan motor is a three-phase DC motor or a single-phase DC motor. However, the embodiments are only exemplified but are not intended to limit the scope of the disclosure. Also, the conversion circuit can be a three-phase or signal-phase control structure depending on types of the DC motors. Afterward, a braking enable circuit is enabled by an external DC voltage and a braking control signal is generated to turn on the power switch elements, thus braking the fan motor to ensure that the fan motor is stationary before the fan motor is started up (S20). The braking enable circuit is connected to the conversion circuit. In this embodiment, the three-phase DC motor is exemplified to further demonstrate the present invention. The braking control signal simultaneously turns on the power switch elements when the braking enable circuit receives the external DC voltage, thus simultaneously grounding the three legs to brake the fan motor.

Afterward, the braking enable circuit is disable by a braking release circuit to stop outputting the braking control signal from the braking enable circuit, thus turning off the power switch elements and releasing the brake on the fan motor (S30). More specifically, when the fan motor is braked to stationary, the braking enable circuit is disabled by the braking release circuit to simultaneously stop outputting the braking control signal to gates of the power switch elements so that the legs are not simultaneously grounded to release the brake on the fan motor. Finally, the external DC voltage is received by a fan motor startup circuit to start up the fan motor revolving (S40).

Especially, the braking enable circuit, the braking release circuit, and the fan motor startup circuit can be implemented by hardware designs of electronic circuits. However, the embodiment is only exemplified but is not intended to limit the scope of the disclosure. That is, the functions of braking and starting up the fan motor can be implemented by software or firmware designs. The hardware designs of electronic circuits are exemplified for further demonstration and described as follow. The braking enable circuit, the braking release circuit, and the fan motor startup circuit are composed of electronic components such as power switch elements, resistors, and capacitors. The braking enable circuit includes a first braking enable power switch, a second braking enable power switch, and at least one resistor electrically connected between the first braking enable power switch and the second braking enable power switch. The braking release circuit includes a braking release power switch, a braking release resistor, and a braking release capacitor. The fan motor startup circuit includes a first startup power switch, a second startup power switch, a startup resistor, a startup capacitor, and at least one resistor electrically connected between the first startup power switch and the second startup power switch.

When the fan motor braking apparatus receives the external DC voltage, the braking enable circuit, the braking release circuit, and the fan motor startup circuit are connected to the external DC voltage so that the external DC voltage simultaneously supplies power to the braking enable circuit, the braking release circuit, and the fan motor startup circuit. Because the braking enable circuit is supplied by the external DC voltage, the first braking enable power switch and the second braking enable power switch are turned on by the external DC voltage, and the braking control signal is generated from the braking enable circuit. Especially, the braking control signal is a high-level control signal and the braking control signal is simultaneously applied to gates of the power switch elements in the three lower legs to simultaneously turn on the three power switch elements, thus simultaneously grounding the three legs to brake the fan motor.

In addition, the braking release circuit and the fan motor startup circuit are simultaneously supplied by the external DC voltage when the braking enable circuit is supplied by the external DC voltage. At this time, a first resistor-capacitor (RC) circuit composed of the braking release resistor and the braking release capacitor is charged by the external DC voltage. Also, a second resistor-capacitor (RC) circuit composed of the startup resistor and the startup capacitor is charged by the external DC voltage. The first RC circuit provides a first time constant τ1 and the second RC circuit provides a second time constant τ2. Especially, the second time constant τ2 is greater than the first time constant τ1. Accordingly, the speed of charging the braking release capacitor is faster than that of charging the startup capacitor when the first RC circuit and the second RC circuit are simultaneously charged by the external DC voltage. Hence, the braking release power switch is first turned on so that the first braking enable power switch and the second braking enable power switch are turned off when the voltage of charging the braking release capacitor is high enough to up to a voltage level. Accordingly, the braking enable circuit stops simultaneously outputting the braking control signal to gates of the first auxiliary power switch element, the second auxiliary power switch element, and the third auxiliary power switch element so that the legs are not simultaneously grounded to release the brake on the fan motor.

Afterward, the first startup power switch and the second startup power switch are turned on when the voltage of charging the startup capacitor is high enough to up to a voltage level. Hence, the external DC voltage is provided to the conversion circuit through the fan motor startup circuit to convert and provide the required power for supplying the fan motor. In addition, a drive controller is provided to switch the power switch elements to drive the fan motor revolving by the required power.

In conclusion, the present disclosure has following advantages:

1. The fan motor braking apparatus is provided to brake the fan motor to ensure that the fan motor is stationary before the fan motor is started up, thus avoiding damage or failed startup of the fan motor from external force;

2. The simple electronic components, such as transistor(s), resistor(s), and capacitor(s) are used to implement high-accurate control of brake protection, brake release, and startup rotation for the fan motor; and 3. The fan motor braking apparatus can be suitable for three-phase or single-phase DC motor control structure. The braking enable circuit 20, the braking release circuit 30, and the fan motor startup circuit 40 can be implemented by hardware designs of electronic circuits. Also, the functions of braking and starting up the fan motor 50 can be implemented by software or firmware designs, thus achieve wide and flexible applications of the fan motor braking apparatus.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A fan motor braking apparatus providing a braking protection before the fan motor revolving, the fan motor braking apparatus comprising:
    a conversion circuit having a plurality of power switch elements, and electrically connected to the fan motor; the power switch elements configured to form a multiple-leg circuit with upper legs and lower legs;
    a braking enable circuit connected to the conversion circuit, and configured to receive an external DC voltage;
    a braking release circuit connected between the external DC voltage and a control input of the braking enable circuit, and configured to receive the external DC voltage to charge a first resistor-capacitor circuit of the braking release circuit; and
    a fan motor startup circuit configured to receive the external DC voltage;
    wherein
        the braking enable circuit is configured to generate a braking control signal to turn on the power switch elements of the lower legs to brake the fan motor when the braking enable circuit is configured to receive the external DC voltage;
        the braking release circuit is configured to disable the braking enable circuit to stop outputting the braking control signal to turn off the power switch elements of the lower legs to release the brake on the fan motor when the first resistor-capacitor circuit is charged to enable the braking release circuit and the fan motor is braked to stationary; and
        the fan motor startup circuit starts sending power received from the external DC voltage to the conversion circuit after the braking release circuit disables the braking enable circuit.

2. The fan motor braking apparatus in claim 1, wherein the fan motor startup circuit is configured to receive the external DC voltage to start up the fan motor revolving when the braking release circuit is enabled.

3. The fan motor braking apparatus in claim 1, wherein the braking enable circuit comprises a first braking enable power switch and a second braking enable power switch; the first braking enable power switch is connected to the second braking enable power switch; the braking control signal is outputted from the first braking enable power switch.

4. The fan motor braking apparatus in claim 3, wherein the braking release circuit comprises a braking release power switch, a braking release resistor, and a braking release capacitor; the first resistor-capacitor circuit is composed of the braking release resistor and the braking release capacitor, and the first resistor-capacitor circuit is electrically connected to the braking release power switch.

5. The fan motor braking apparatus in claim 4, wherein the fan motor startup circuit comprises a first startup power switch, a second startup power switch, a startup resistor, and a startup capacitor; a second resistor-capacitor circuit is composed of the startup resistor and the startup capacitor, and the second resistor-capacitor circuit is electrically connected to the second startup power switch.

6. The fan motor braking apparatus in claim 5, wherein the first resistor-capacitor circuit provides a first time constant and the second resistor-capacitor circuit provides a second time constant; the second time constant is greater than the first time constant.

7. The fan motor braking apparatus in claim 6, wherein the fan motor startup circuit is configured to receive the external DC voltage to start up the fan motor revolving when the braking release circuit is enabled.

8. The fan motor braking apparatus in claim 1, wherein the fan motor braking apparatus further comprises:
a diode electrically connected between the conversion circuit and the fan motor startup circuit to ensure that the external DC voltage is provided to the conversion circuit through the fan motor startup circuit and the DC voltage is converted into the required power for supplying the fan motor.

9. The fan motor braking apparatus in claim 1, wherein the fan motor is a three-phase DC motor or a single-phase DC motor, and the conversion circuit is correspondingly a three-phase conversion circuit or a single-phase conversion circuit.

10. A fan motor braking apparatus providing a braking protection before the fan motor revolving, the fan motor braking apparatus comprising:
a conversion circuit having a plurality of power switch elements, a plurality of auxiliary power switch elements, and a plurality of current-limiting resistors, and electrically connected to the fan motor; the power switch elements configured to form a multiple-leg circuit with upper legs and lower legs;
a braking enable circuit connected to the conversion circuit, and configured to receive an external DC voltage;
a braking release circuit connected between the external DC voltage and a control input of the braking enable circuit, and configured to receive the external DC voltage to charge a first resistor-capacitor circuit of the braking release circuit; and
a fan motor startup circuit configured to receive the external DC voltage;
wherein
the braking enable circuit is configured to generate a braking control signal to turn on the auxiliary power switch elements to brake the fan motor when the braking enable circuit is configured to receive the external DC voltage;
the braking release circuit is configured to disable the braking enable circuit to stop outputting the braking control signal to turn off the auxiliary power switch elements to release the brake on the fan motor when the first resistor-capacitor circuit is charged to enable the braking release circuit; and
the fan motor startup circuit starts sending power received from the external DC voltage to the conversion circuit after the braking release circuit disables the braking enable circuit.

11. The fan motor braking apparatus in claim 10, wherein the braking enable circuit comprises a first braking enable power switch and a second braking enable power switch; the first braking enable power switch is connected to the second braking enable power switch; the braking control signal is outputted from the first braking enable power switch; the braking release circuit comprises a braking release power switch, a braking release resistor, and a braking release capacitor; the first resistor-capacitor circuit is composed of the braking release resistor and the braking release capacitor, and the first resistor-capacitor circuit is electrically connected to the braking release power switch; the fan motor startup circuit comprises a first startup power switch, a second startup power switch, a startup resistor, and a startup capacitor; a second resistor-capacitor circuit is composed of the startup resistor and the startup capacitor, and the second resistor-capacitor circuit is electrically connected to the second startup power switch.

12. The fan motor braking apparatus in claim 11, wherein the first resistor-capacitor circuit provides a first time constant and the second resistor-capacitor circuit provides a second time constant; the second time constant is greater than the first time constant.

13. A method of controlling a fan motor braking apparatus providing a braking protection before the fan motor revolving, the method comprising following steps:
(a) providing a conversion circuit with a plurality of power switch elements, wherein the conversion circuit is electrically connected to the fan motor; and
(b) enabling a braking enable circuit by an external DC voltage and generating a braking control signal to turn on the power switch elements, thus braking the fan motor,
wherein
the fan motor braking apparatus comprises a braking release circuit and a fan motor startup circuit;
the braking release circuit is connected between the external DC voltage and a control input of the braking enable circuit; and
the fan motor startup circuit starts sending power received from the external DC voltage to the conversion circuit after the braking release circuit disables the braking enable circuit.

14. The method of controlling the fan motor braking apparatus in claim 13, wherein after the step (b), further comprises:
(c) disabling the braking enable circuit by the braking release circuit to stop outputting the braking control signal from the braking enable circuit, thus turning off the power switch elements and releasing the brake on the fan motor; and
(d) receiving the external DC voltage by the fan motor startup circuit to start up the fan motor revolving.

15. The method of controlling the fan motor braking apparatus in claim 13, wherein the braking enable circuit comprises a first braking enable power switch and a second braking enable power switch; the first braking enable power switch is connected to the second braking enable power switch; the braking control signal is outputted from the first braking enable power switch.

16. The method of controlling the fan motor braking apparatus in claim 15, wherein the braking release circuit comprises a braking release power switch, a braking release resistor, and a braking release capacitor; the first resistor-capacitor circuit is composed of the braking release resistor and the braking release capacitor, and the first resistor-capacitor circuit is electrically connected to the braking release power switch.

17. The method of controlling the fan motor braking apparatus in claim 16, wherein the fan motor startup circuit comprises a first startup power switch, a second startup power switch, a startup resistor, and a startup capacitor; a second resistor-capacitor circuit is composed of the startup resistor and the startup capacitor, and the second resistor-capacitor circuit is electrically connected to the second startup power switch.

18. The method of controlling the fan motor braking apparatus in claim 17, wherein the first resistor-capacitor circuit provides a first time constant and the second resistor-capacitor circuit provides a second time constant; the second time constant is greater than the first time constant.

19. The method of controlling the fan motor braking apparatus in claim 13, wherein the fan motor braking apparatus further comprises:
   a diode electrically connected between the conversion circuit and the fan motor startup circuit to ensure that the external DC voltage is provided to the conversion circuit through the fan motor startup circuit and the DC voltage is converted into the required power for supplying the fan motor.

20. The method of controlling the fan motor braking apparatus in claim 13, wherein the fan motor is a three-phase DC motor or a single-phase DC motor, and the conversion circuit is correspondingly a three-phase conversion circuit or a single-phase conversion circuit.

* * * * *